(12) United States Patent
Burton et al.

(10) Patent No.: US 6,448,738 B1
(45) Date of Patent: Sep. 10, 2002

(54) METHOD OF CONTROLLING AN ELECTRIC MOTOR HAVING A NUMBER OF PHASE WINDINGS

(75) Inventors: Anthony Walter Burton, West Midlands (GB); Steven John Horton, Solihull (GB); Andrew James Stephen Williams, West Midlands (GB); John Michael Ironside, Birmingham (GB); Russell Wilson Jones, Warwickshire (GB)

(73) Assignee: TRW Lucas Varity Electric Steering Ltd., West Midlands (GB)

( * ) Notice: Subject to any disclaimer, the term of this patent is extended or adjusted under 35 U.S.C. 154(b) by 0 days.

(21) Appl. No.: 09/309,050

(22) Filed: May 10, 1999

(30) Foreign Application Priority Data

May 13, 1998 (GB) .............................. 9810101

(51) Int. Cl.$^7$ ................................ H02P 5/28
(52) U.S. Cl. ...................... 318/807; 318/798; 318/806
(58) Field of Search ................. 318/443, 444, 318/798–812

(56) References Cited

U.S. PATENT DOCUMENTS 5,519,300 A * 5/1996 Leon et al. ............... 318/729
6,008,618 A * 12/1999 Bose et al. ................ 318/800

* cited by examiner

Primary Examiner—Robert E. Nappi
Assistant Examiner—Rina I. Duda
(74) Attorney, Agent, or Firm—Tarolli, Sundheim, Covell, Tummino & Szabo L.L.P.

(57) ABSTRACT

A motor control strategy for use in combination with an electric motor (1) having a number of phase windings (201, 202, 203) is disclosed, the motor (1) being adapted to produce an output torque in response to current in the windings comprising the steps of during normal operation generating a motor torque demand signal indicative of the output torque required from the motor (1), applying a first set of currents to the windings of the motor in response to the motor torque demand signal to produce a first output torque from the motor and during a test operation to enable diagnostics to be performed generating a motor current demand signal indicative of the total current required in the motor windings (201, 202, 203) and adjusting the currents applied to one or more of the windings in response to both the torque demand signal and the motor current demand signal, whereby the adjusted currents produced in the windings are substantially equal to the total current demanded by the motor current demand signal regardless of the value of the motor torque demand signal and the motor (1) produces a second output torque substantially equal to the first output torque produced during normal operation.

16 Claims, 6 Drawing Sheets

METHOD OF CONTROLLING AN ELECTRIC MOTOR HAVING A NUMBER OF PHASE WINDINGS

FIELD OF INVENTION

This invention relates to improvements in electric motors, and in particular to an improved method of testing the integrity of the motor and associated motor drive circuitry of an electrical power assisted steering system.

BACKGROUND OF THE INVENTION

Electric motors are becoming increasingly common in a diverse range of applications. It is known, for example, to provide an electric power steering system of the kind comprising an input shaft, an output shaft, a torque sensor adapted to measure the torque in the input shaft, and an electric motor adapted to apply an assistance torque to the output shaft dependent upon the torque measured by the torque sensor.

A typical electric motor comprises a rotor, a stator and a number of phase windings on a yoke. Applying suitable voltages across each of the phase windings causes current to flow through the windings, generating a current flux vector in the air gap between the stator and the rotor. This current flux interacts with the magnetic field of the rotor to cause the rotor to rotate to a point of equilibrium in which the flux vector is aligned with the axis of the rotor magnetic field.

To cause the rotor to turn continuously, the current passed through the windings must be varied in a sequence. This causes the flux vector to rotate. This can be achieved by modulating the voltages across each winding under the control of a motor drive circuit.

SUMMARY OF THE INVENTION

According to a first aspect, the invention comprises a motor control strategy for use in combination with an electric motor said motor having a number of phase windings and said motor being adapted to produce an output torque in response to current in said windings comprising the steps of:

during normal operation generating a motor torque demand signal indicative of the output torque required from said motor, applying a first set of currents to said windings of said motor in response to said motor torque demand signal to produce a first output torque from said motor and during a test operation to enable diagnostics to be performed generating a motor current demand signal indicative of the total current required in said motor windings and adjusting said currents applied to one or more of said windings in response to both said torque demand signal and said motor current demand signal, whereby said adjusted currents produced in said windings are substantially equal to the total current demanded by said motor current demand signal regardless of the value of said motor torque demand signal and said motor produces a second output torque substantially equal to said first output torque produced during normal operation.

By total current we mean the algebraic vector sum of all the currents in the windings of the motor.

Thus, the method may comprise a test operation of controlling the total motor current to a predetermined required value without affecting the amount of torque produced by the motor. This allows a predetermined test current to be applied without altering the output torque characteristics of the motor, making the tests transparent to a user of the motor.

The motor may form a part of an electrical power assisted steering system of the kind set forth.

Preferably the test operation is performed on-line in real time, i.e. when the steering system is in use and the vehicle is running. It may be applied when the vehicle is moving or stationary. The total current in the motor may be held constant by the test operation, or may be varied.

The method may comprise the additional steps of using feedback control to control the currents in the motor windings.

Those skilled in the art to which the present invention relates will be familiar with the so-called "vector control" or "flux vector control" technique for electric motor control in which the manipulated variables are the direct (d-axis) and quadrature (q-axis) components of the motor current vector. Characteristic of the d-axis current is it direct alignment with the rotor magnetic field (which therefore generates zero motor torque). Characteristic of the q-axis current is its quadrature alignment with the rotor magnetic field which therefore generates maximum torque per ampere.

During normal operation the technique may comprise the steps of measuring the currents in one or more of the motor windings, measuring the motor rotor position, processing the measured currents in combination with the rotor position to produce a measured d-axis and a q-axis current component, processing the motor torque demand signal to produce a respective d-axis and q-axis current demand signal, converting the d-axis and q-axis current demand signals into a phase voltage demand signal for each winding; and applying a phase winding voltage across each winding in response to the respective voltage demand signal.

In an alternative technique, the motor current demand signal may be stored as a d-axis and q-axis component rather than a single motor current value, and so the step of processing the motor torque demand signal to produce the d-axis and q-axis values can be omitted as they are already in that form.

During the test operation, the method may further comprise the steps of adjusting the winding currents by generating an additional d-axis current demand signal. This is generated by processing the motor current demand signal in combination with the motor torque demand d-axis and q-axis current components. In this case, the q-axis and d-axis current demand signals used to generate the individual phase winding voltages will be equivalent to the normal q-axis current demand signal and the sum of the normal d-axis current demand value and the additional d-axis current component produced due to the test operation respectively.

The principle advantage of employing the non-torque producing component of motor current for diagnostic testing of the integrity of the motor and/or the motor drive circuitry is that the testing sequences can be designed in a non-intrusive fashion so that they do not affect or interrupt the normal running of the machine.

The non-intrusive nature of testing associated with the present invention may present the following advantages:

Diagnostic tests may be activated over a wider operating envelope, for example, during normal operation rather than just at power down, since changes in torque will not be apparent to the driver.

Diagnostic tests may be operated at substantially higher current levels where appropriate to improve the accuracy and/or reliability of the diagnostic tests than tests previously carried out using torque producing current.

The test routine may apply the adjusted current to the windings over a predetermined period of time t. It may further comprise the steps of performing one or more diagnostic test sub-routines during the test routine. The adjusted current may be kept constant throughout the predetermined period.

The test routine may be adapted for use in combination with a motor overload current detection means and may further comprise a motor overload current test sub-routine. The motor overload current test sub-routine may comprise the steps of generating a motor current demand signal which corresponds to a motor current in excess of a predetermined level. It is known to provide, as part of a motor drive circuit, a motor overload detection means which is adapted to produce an output indicative of an overload condition. For example, an error flag may be lowered (or raised) if the current in the motor exceeds the predetermined safe level. The test sub-routine may comprise the steps of testing the output of such an overload current detection means when the overload current is applied by the test routine.

The motor overload test routine may therefore comprise applying a simulated overload current to the motor by generating a suitable motor current demand value, and measuring the output of the motor overload current detection means during the simulated overload. If no overload signal is produced, i.e. the error flag is not lowered (or raised), the overload current test sub-routine may flag the overload detection circuit as inoperative.

The motor test routine may further comprise a sub-routine adapted to calculate the temperature of the motor.

It may comprise the steps of measuring the q-axis current and the q-axis voltage in the motor, measuring the d-axis current and the d-axis voltage in the motor, calculating the motor resistance from the algebraic vector sum of the voltage across the motor and the algebraic vector sum of the currents in the windings of the motor and estimating the motor temperature based upon the measured motor resistance. Performing these steps at elevated motor current and voltage levels ensures the accuracy and reliability of the calculated motor temperature and employing the present invention allows this to be done in a non-intrusive fashion.

The test routine may comprise a sub-routine adapted to test the contact resistance of a motor relay adapted to isolate the motor from a supply voltage.

The test routine may further comprise a sub-routine adapted to test the integrity of one or more motor drive stage filter capacitors. The filter test sub-routine may comprise the steps of generating a motor current demand corresponding to a predetermined current in the motor, isolating the one or more filter capacitors (of the drive circuit) from the supply voltage and measuring the rate of fall of voltage across the filter capacitors. Obviously, the filter capacitor should preferably be fully charged from the supply voltage before it is isolated and tested using the current in the motor as a load. The time taken for the voltage across the capacitor fall from a first voltage to a second voltage may be used as the basis of the test, with the time being compared to the time that would be expected for a correctly functioning filter. A smaller capacitance, perhaps due to partial breakdown of the dielectric, would loose its charge quicker than a healthy capacitor. Since motor current is kept constant during the test routine, this test can conceivably be performed at any time during operation of the motor.

In accordance with a second aspect, the invention provides an electrical power assisted steering system incorporating a motor and a motor drive circuit adapted to control the motor according to a control strategy of the first aspect of the invention.

BRIEF DESCRIPTION OF THE DRAWINGS

Other features and advantages of the present invention will become apparent to those skilled in the art to which the present invention relates from the following detailed description, by way of example only, with reference to the accompany drawings of which.

DETAILED DESCRIPTION OF THE INVENTION

A method of controlling an electric motor for an electric power steering system comprises a combination of current feedback with vector control to provide a smooth and stable motor control strategy.

Figure 1:
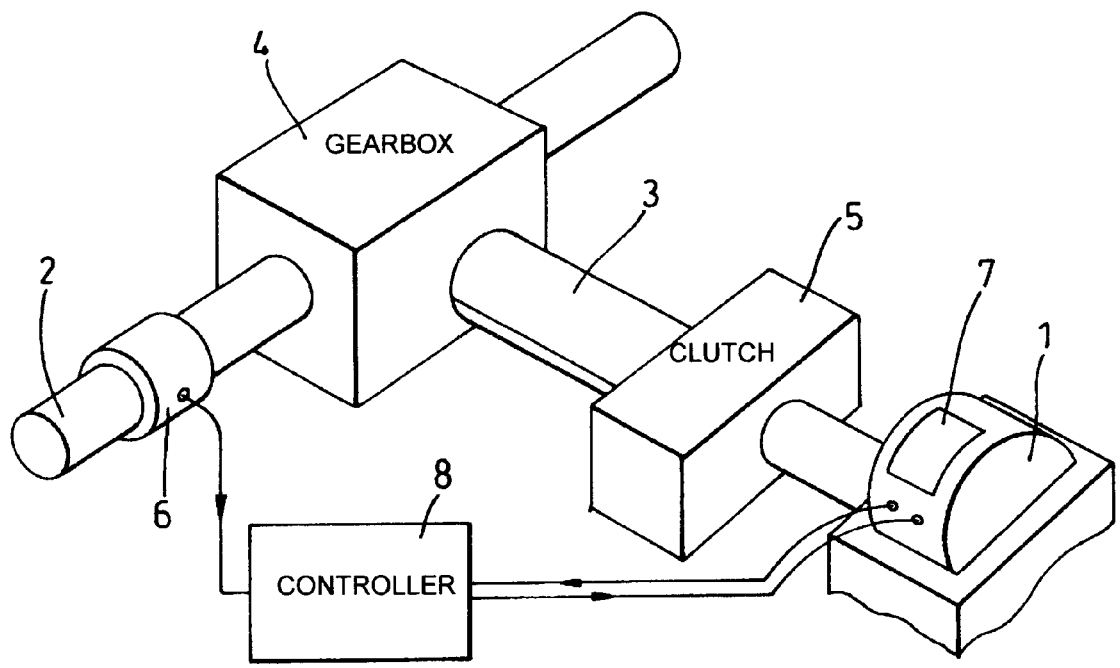
FIG. 1 is an overview of the components of a typical EPAS system.

FIG. 1 shows schematically the specific components of an electric power steering system that may include a motor control strategy in accordance with the present invention. An electric motor 1 applies a calculated torque to a steering column 2 via a motor shaft 3 and a gearbox 4. The calculated torque is derived as a function of the driver's demand and other parameters such as vehicle and/or steering speed and steering position. An (optional) clutch 5 may also be provided between the motor and the gearbox. A torque sensor 6 is provided on the steering column shaft, and torque measurements from the torque sensor are input to a motor controller which is used to control the electric motor, in turn providing assistance in turning the steering column. The motor includes a motor position sensor implemented using three Hall effect switches 7 and a motor controller which implements a motor control strategy.

Figure 2:
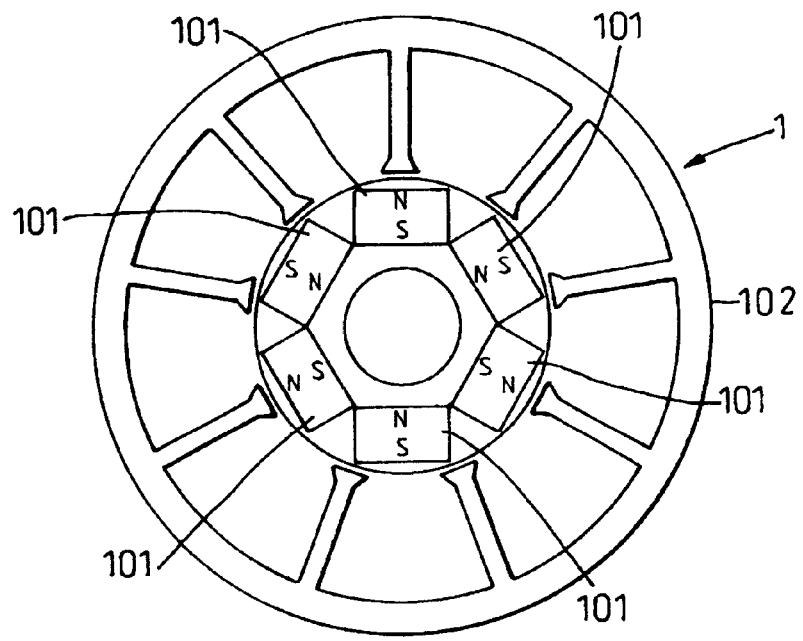
FIG. 2 shows a motor layout for a direct current brushless motor.

The electric motor 1 is shown in FIG. 2 and comprises a three-phase brushless permanent magnet motor. The rotor has six-poles 101 and the stator 102 comprises a 9-slot copper wound element. It should be noted that as the rotor completes a full revolution of 360° mechanical, there are six permanent magnet north-south pole transitions seen at any position on the stator, corresponding to three complete electrical revolutions.

Figure 3:
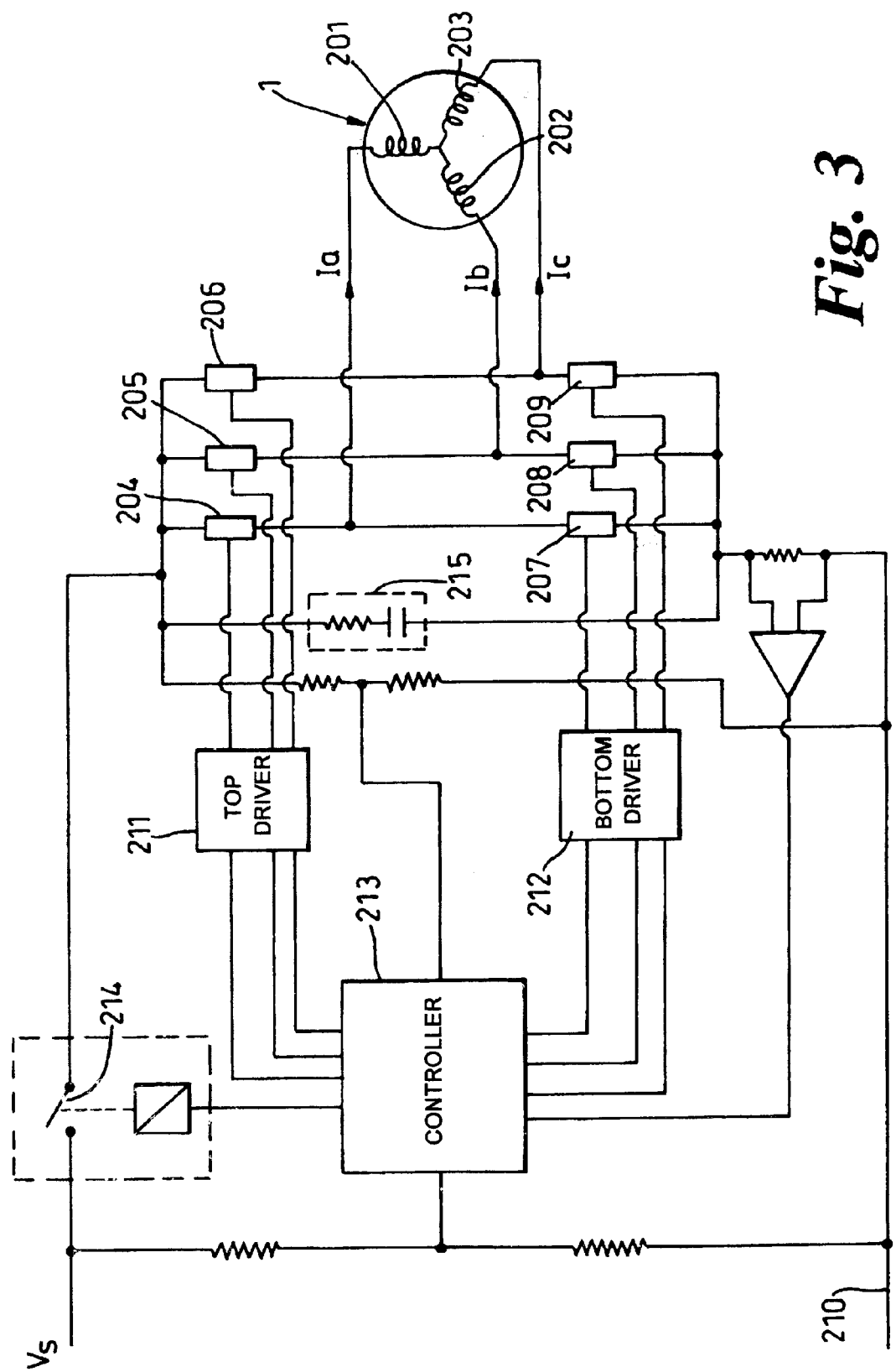
FIG. 3 shows a typical motor drive circuit.

The motor and its associated drive stage circuitry are shown in FIG. 3. Each phase winding 201, 202, 203 is connected through a respective upper switching device 204, 205, 206 to a positive voltage supply Vs and a lower switching device 207, 208, 209 to a less positive (or ground) supply 210. The switching devices are modulated using pulse width modulation to apply a varying average voltage to each phase. The pulse width modulation rate and duly cycle are generated by a top driver 211 and a bottom driver 212 which receive phase voltage demand signals from a controller 213. The voltage across each phase produces a current $I_a$, $I_b$, $I_c$ in the respective inductive windings. These currents $I_a$, $I_b$ and $I_c$ generate a current flux vector in the motor which interacts with the rotor magnetic field vector to produce torque and hence rotation of the rotor. A relay 214 is provided for isolating the motor and drive circuitry from the supply voltage, and a filter capacitor 215 smoothes any possible supply voltage fluctuations.

Figure 4:
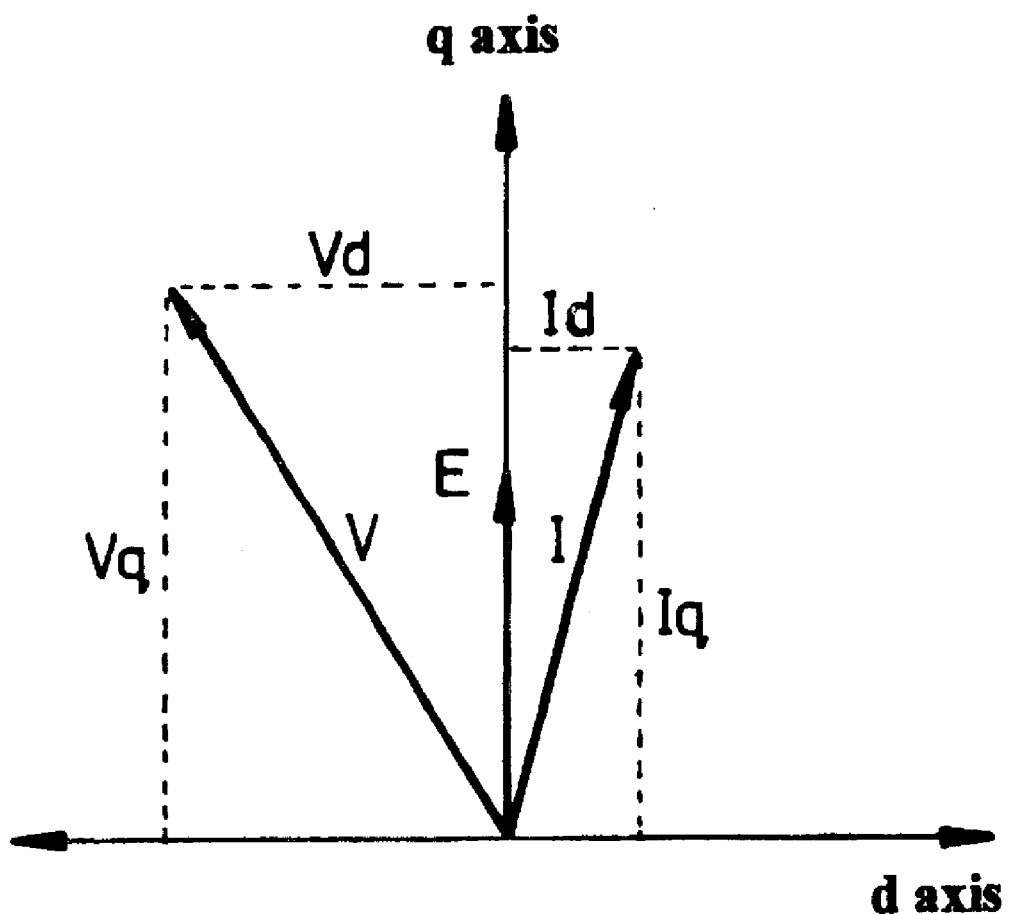
FIG. 4 illustrates the relationship between the d-axis and q-axis current and voltage vector components.

The interaction between the current vector I and the rotor magnetic field vector can be expressed in terms of vectors referred to the d-axis and q-axis frame shown in FIG. 4. In this frame, the d-axis is chosen to correspond to the magnetic field vector of the rotor. The q-axis, or quadrature axis, is at 90 degrees to this axis. The current vector I due to the current in the stator windings can be plotted on this frame and is shown in FIG. 4. The voltage vectors $V_d$, $V_q$ are also shown, and are out of phase with the current vectors due to the inductive nature of the windings. Generally, if the magnetic field axis and current vector are in line, (when the current vector I is aligned with the d-axis on the d-q axis frame), no torque is produced. If the vector I is 90° ahead of the magnetic field vector (i.e. in line with the q-axis), peak torque per ampere of motor current is produced.

Figure 5:
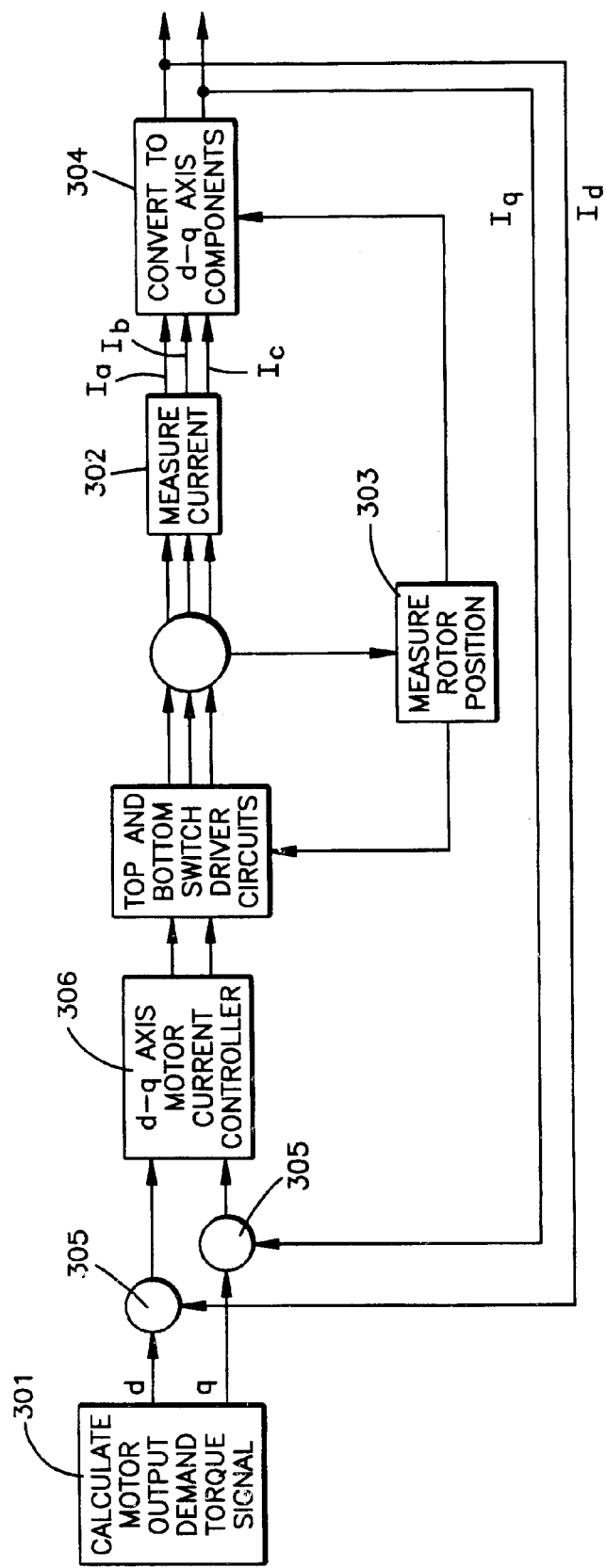
FIG. 5 is a schematic of the motor control strategy.

The motor control scheme is illustrated schematically in FIG. 5. In an initial stage 301, a motor output torque demand signal is calculated. In the power steering system, this value is dependent upon the torque applied to the steering column by the vehicle driver, and optionally vehicle speed and/or steering velocity. The value of the torque demand signal is a measure of how much assistance torque is to be applied by the motor. In a simple system, the output torque demand value may take any value between a negative and positive maximum, and be linearly related to the motor output torque required.

In another stage 302 the current $I_a$, $I_b$, $I_c$ in each of the motor phases is measured during use. This can be done by measuring the current across two of the three phases and inferring the third current.

The rotor position is measured in a further stage 303, whereafter the measured $I_a$, $I_b$, $I_c$ currents are converted at 304 into the d-q axis frame.

The torque demand value is also converted into a d-axis and a q-axis component.

The measured d-axis and q-axis current values $I_d$, $I_q$ are then compared at 305 to the torque demand d-axis and q-axis values, the difference in the values being input to a d-q axis motor current controller 306.

The controller converts the d-axis and q-axis values at its inputs into the required voltage values for each phase using a motor rotor position information.

Finally, these phase voltage values are passed to the top and bottom switch driver circuits for controlling the switching devices and hence voltage on each phase.

The motor control strategy also incorporates a motor test routine which enables the current in the motor to be adjusted, in use, without altering the torque output of the motor. This is achieved by manipulation of the motor currents in the d-q frame Since it is has been recognised by the Applicant that d-axis components of the current flux vector do not induce torque in the motor, an additional d-axis component can be added to the d-axis and q-axis torque demand values without affecting the output torque from the motor. The total motor current is generally proportional to the magnitude of the current flux vector, and so increasing the d-axis component increases the total motor current. The additional d-axis current value is updated as and when necessary according to the specific requirements of the diagnostic test routines.

Figure 6:
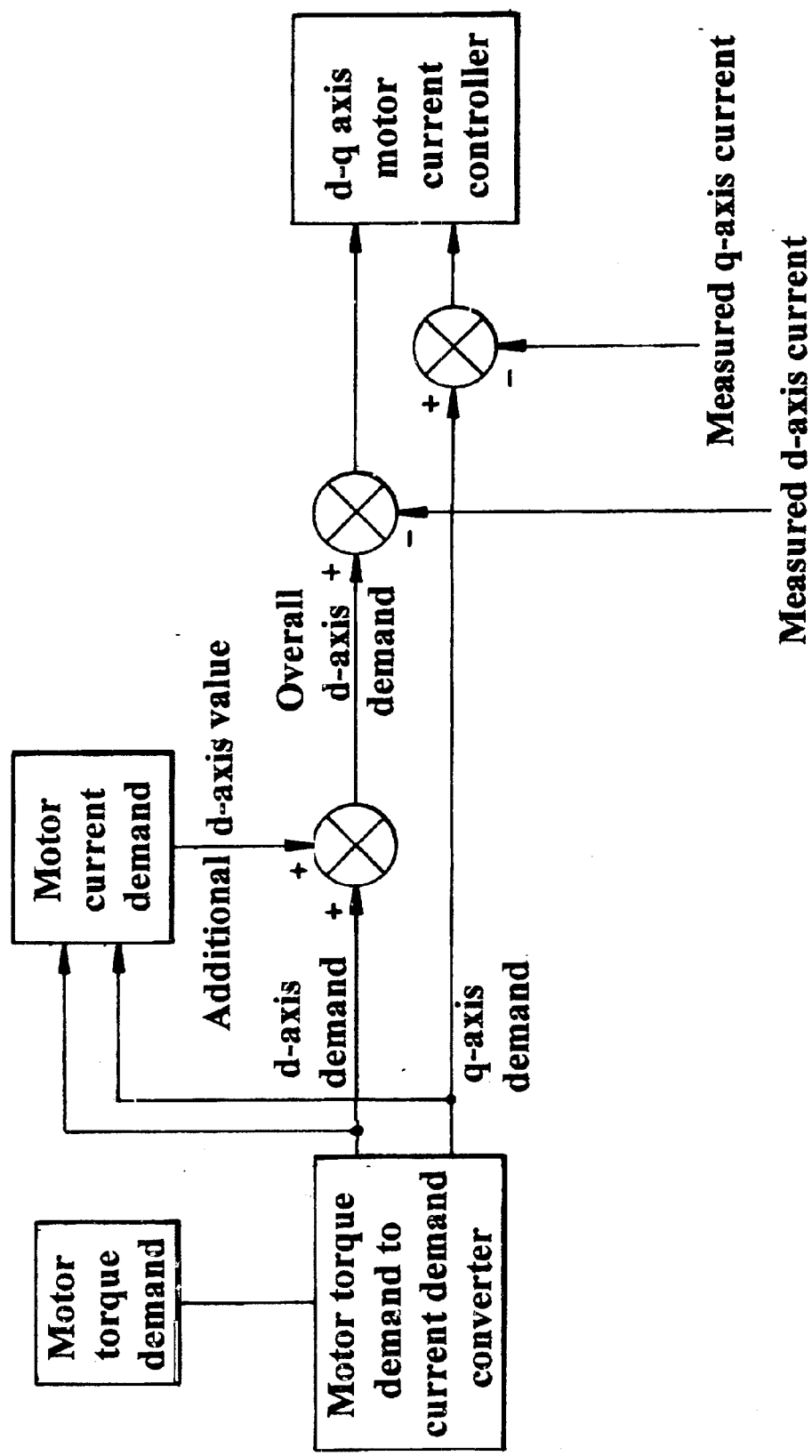
FIG. 6 illustrates the test operation of the motor control strategy in which an additional d-axis component is generated.

The test routine shown in FIG. 6 generates an additional d-axis current value to add to the d-axis and q-axis current demand values in response to a motor current demand signal, either supplied from a processing unit or held in memory and the torque demand signal value. The measured value of d-axis and q-axis motor current values are therefore compared with the q-axis motor current demand signal and with the sum of the d-axis motor current demand signal and the additional d-axis value. Thus, as the d-axis and q-axis component of the motor current demand signal vary over time, corresponding changes in the additional d-axis value applied during the test routine are automatically made to maintain a constant magnitude of motor current vector. This allows several important diagnostic sub-routines to be performed if required.

Several proposed motor test sub-routines are described in detail hereinbelow.

1. Extended Operation: Motor Overload Protection Test

The motor overload protection test provides an illustration of one aspect of the advantages of the present invention in that it is representative of an existing diagnostic strategy whose operating envelope may be widened by employing the present invention.

It is possible to provide a means for testing the actual d-axis current and q-axis current to check for excessively high current levels in the motor. In the event that either the motor q-axis current or d-axis current or total current exceeds a preset "safe" limit, an error signal can be produced or a current limit introduced to reduce the demanded motor torque value until the current falls back to a safer level. A sub-routine may be provided for testing the output of such motor overload current detection means as part of the test operation of the motor control strategy.

The test sub-routine may comprise a first step of generating a motor current demand value which is equivalent to a total current through the motor in excess of the "safe" value. Thus, the test routine would apply an excessive current to the motor, and should trigger the motor overload current detection means. The output of the protection device can then be checked to determine if it is correctly functioning. If is does not produce an output indicating a fault, it is in error.

Because no extra torque is produced in the motor during the test routine, (the overload current is produced by adding an additional d-axis current), the test is transparent to the user of the motor, and it can be performed at any time. Such a test could not otherwise be performed without inducing an unwanted torque in the motor.

An overload test circuit which may be tested in such a manner is disclosed in our earlier application WO 97/36777, which is incorporated herein by reference. The test circuit disclosed therein includes, an overload current limit that may vary with vehicle speed. In such a case, the motor current demand signal may also be varied with vehicle speed.

2. Improved Accuracy: Motor Temperature Calculation

Figure 7:
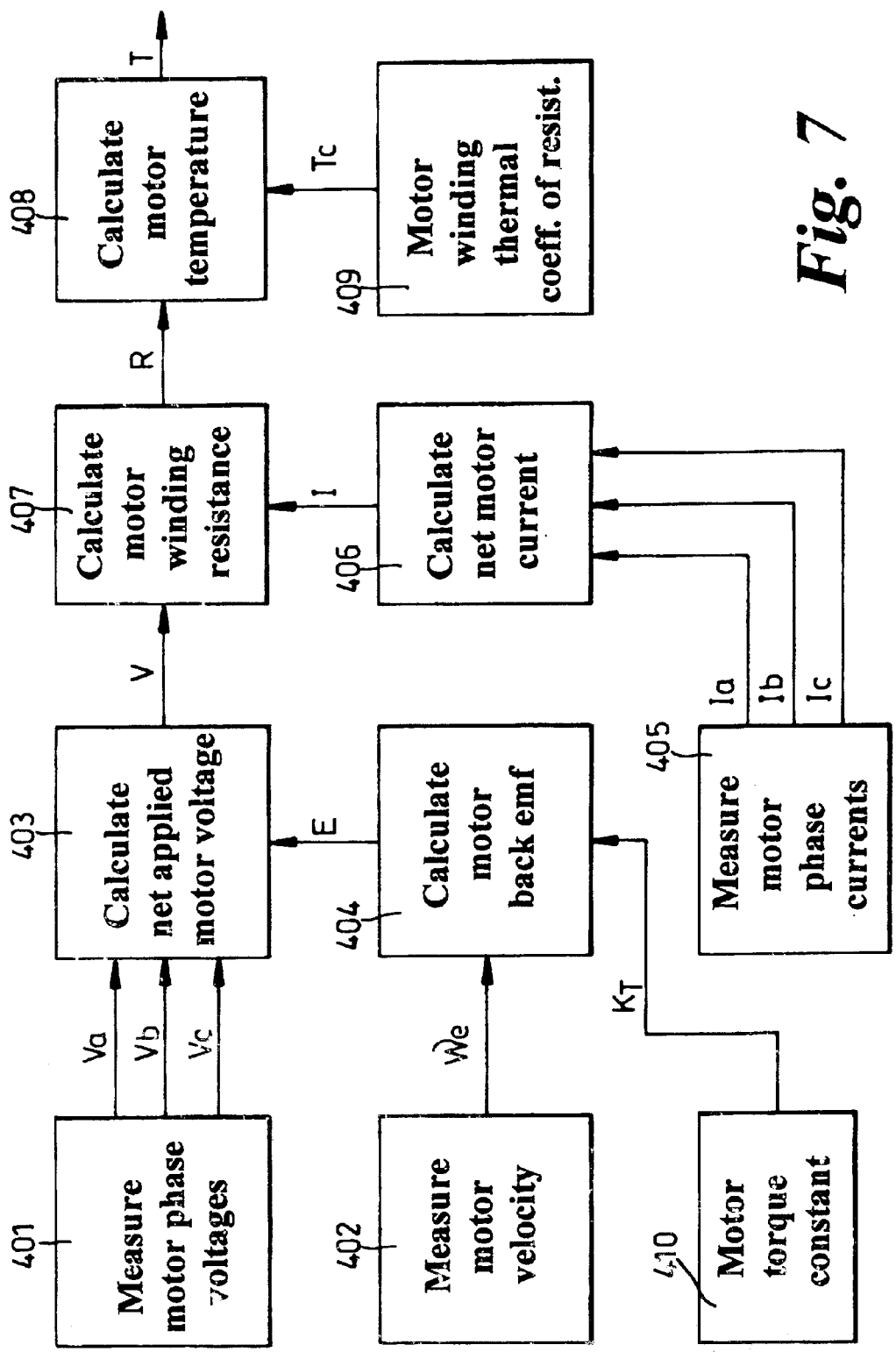
FIG. 7 is an overview of the motor temperature calculation sub-routine.

A motor temperature calculation may form part of a motor over temperature diagnostic and is an example of an existing diagnostic strategy whose accuracy and/or reliability may be widened by employing the present invention. It is shown schematically in FIG. 7 of the drawings.

Those skilled in the art will appreciate that the motor winding temperature can be calculated 408 from a calculated motor winding resistance if the thermal coefficient of resistance characteristic of the motor winding 409 is known. In addition, those skilled in the art will appreciate that the motor winding resistance can be calculated from the ratio of the applied motor voltage and the resulting motor current 407.

The net motor current in turn can be calculated 406 from measurements of the phase currents 405. Equally the net applied motor voltage can be calculated 403 from the measured motor phase voltages 401 and a calculated motor back emf 404. The motor back emf can in turn be calculated from the product of a measured motor velocity 402 and a known motor torque constant 410.

Those skilled in the art to which the present invention relates will appreciate that the accuracy of the calculated motor temperature and hence the reliability of any diagnostic which uses the calculated motor temperature will depend heavily on the accuracy of the calculated motor resistance value.

Those skilled in the art to which the present invention relates will further appreciate that the accuracy of the calculated motor resistance value is diminished for small values of measured motor phase voltages and motor phase currents due to inaccuracies that arise in the practical measurement of these values. Furthermore, those skilled in the art to which the present invention relates, will appreciate the benefit of employing the present invention to raise the magnitude of both the measured motor phase voltages and motor phase currents in a non-intrusive fashion so as to ensure the accuracy and reliability of the calculated motor winding temperature at all times.

C. Filter Capacitor Test Subroutine

By connecting the primary bank of motor filter capacitors 215 to the known supply voltage Va, connecting to a known load, and then isolating from the supply Vs the integrity of the capacitors can be tested. The known load is provided by generating a constant current determined by the motor current demand value in the motor during the test routine. Filter integrity is checked by increasing the ratio of fall of voltage across filters.

D. Diagnostic Test: Relay Test

The relay test provides an example illustration of a diagnostic strategy that can be considered by employing the present invention.

The relay test provides a test of the ability of the relay 214 in FIG. 3 to break a moderate current and to reveal any incipient relay sticking and to clean the relay contacts. The test involves driving the motor so as to raise the non-torque producing component of current to a predetermined level and to set the torque producing component of current to zero. The relay shall then be turned off and, after a predetermined time delay, both the torque producing and non-torque producing components of the motor current are calculated from measurements of the motor phase currents. If the calculated torque producing and non-torque producing components of the motor current are not below a predetermined level after the predetermined time delay, then it may be concluded that the relay has a short circuit fault.

Those skilled in the art to which the present invention relates will appreciate that for example of the electric power assisted steering system it is essential that the relay test is conducted using non-torque producing current in order to render the test both safe and unobtrusive to the driver of the vehicle to which the system is fitted. Those skilled in the art to which the present invention relates will also appreciate that the relay test utilising the present invention may have advantageous application in many other instances where relays are employed.

We claim:

1. A method of controlling an electric motor having at least three phase windings, said motor being adapted to produce an output torque in response to currents applied to said windings, the method comprising the steps of:

during normal operation, generating a motor torque demand signal indicative of the output torque required from said motor, and applying a first set of currents to said windings of said motor dependent upon the value of said motor torque demand signal, said currents producing an output torque from said motor; and during a test operation in which diagnostics are performed on said motor, generating a motor current demand signal indicative of the total current required in said motor windings and adjusting said currents applied to one or more of said windings such that the algebraic vector sum of said adjusted currents applied to said windings is dependent upon the value of said motor current demand signal and independent of the value of said motor torque demand signal while said adjusted currents produce an output torque from said motor which is substantially equal to said output torque produced by the motor during said normal operation.

2. The method according to claim 1 in which said motor forms a part of an electrical power assisted steering system.

3. The method according to claim 1 in which said test operation is performed on-line in real time.

4. The method according to claim 1 which comprises the additional step of using feedback control to control the currents in said windings.

5. The method according to claim 1 further comprising, during normal operation, the steps of measuring the currents in one or more of said motor windings, measuring the motor rotor position, processing said measured currents in combination with said rotor position to produce measured d-axis and q-axis current components, processing said motor torque demand signal to produce d-axis and q-axis current demand signals, converting said d-axis and q-axis current demand signals into a phase voltage demand signal for each of said windings; and applying a phase winding voltage across each winding in response to said respective phase voltage demand signal.

6. The method according to claim 5 in which said motor current demand signal is stored as a d-axis and q-axis component.

7. The method according to claim 5 which during said test operation, further comprises the steps of adjusting the currents in said windings by generating an additional d-axis current demand signal.

8. The method according to claim 7 in which said additional d-axis current demand signal is generated by processing said d-axis and q-axis current demand signals that are calculated from said motor torque demand.

9. The method according to claim 1 which further comprises the steps of performing one more diagnostic test sub-routines during said test operation.

10. The method according to claim 9 for use in combination with a motor overload current detection means, in which said test routine comprises a motor overload current test sub-routine comprising the steps of generating a motor current demand signal which corresponds to a motor current in excess of a predetermined level and testing an output of said motor overload current detection means when said overload current is applied by the test operation.

11. The method according to claim 9 which further comprises a sub-routine adapted to calculate the temperature of the motor.

12. The method according to claim 11 in which said sub-routine is adapted to calculate the temperature of said motor and comprises the steps of measuring the q-axis current and the d-axis current in said motor, measuring the q-axis voltage and d-axis voltage applied to the motor, calculating the back EMF generated by said motor, calculating the motor resistance from said measured q-axis and d-axis voltage and d-axis current, and the back EMF and estimating the motor temperature based upon the measured motor resistance.

13. The method according to claim 9 in which said test operation comprises a sub-routine adapted to test a contact resistance of a motor relay adapted to isolate said motor from a supply voltage.

14. The method according to claim 9 in which said test operation comprises a sub-routine adapted to test the integrity of one or more motor drive stage filter capacitors.

15. The method according to claim 14 which further comprises the steps of generating a motor current demand corresponding to a predetermined current in said motor, isolating said filter capacitors from the supply voltage and measuring the rate of fall of voltage across said filter capacitors.

16. An electrical power assisted steering system incorporating a motor and a motor drive circuit adapted to control said motor according to claim 1.

* * * * *